(12) United States Patent  
Gardner et al.

(10) Patent No.: US 8,143,871 B1
(45) Date of Patent: Mar. 27, 2012

(54) DYNAMICALLY-COMPENSATED CONTROLLER

(75) Inventors: Andrew Joseph Gardner, Boulder, CO (US); Greg Jon Manlove, Colorado Springs, CO (US)

(73) Assignee: Linear Technology Corporation, Milpitas, CA (US)

( * ) Notice: Subject to any disclaimer, the term of this patent is extended or adjusted under 35 U.S.C. 154(b) by 797 days.

(21) Appl. No.: 12/275,114

(22) Filed: Nov. 20, 2008

(51) Int. Cl.
  G05F 1/56 (2006.01)
  G05F 1/565 (2006.01)
  G05F 1/575 (2006.01)

(52) U.S. Cl. .......................... 323/282; 323/283; 363/97
(58) Field of Classification Search .................. 323/282, 323/283; 363/95, 97
  See application file for complete search history.

(56) References Cited

U.S. PATENT DOCUMENTS

| | | | | |
|---|---|---|---|---|
| 6,583,609 B1 * | 6/2003 | Pardoen | ........................ | 323/283 |
| 6,960,904 B2 * | 11/2005 | Matsuura et al. | ............. | 323/283 |
| 7,007,176 B2 * | 2/2006 | Goodfellow et al. | ......... | 713/300 |
| 7,301,488 B2 * | 11/2007 | Leung et al. | .................. | 341/131 |
| 7,319,312 B2 * | 1/2008 | Leung et al. | .................. | 323/285 |
| 7,323,855 B2 * | 1/2008 | Xiao et al. | .................... | 323/283 |
| 7,391,196 B2 * | 6/2008 | Fosler | ........................... | 323/283 |
| 7,609,040 B1 * | 10/2009 | Jain | ............................... | 323/283 |
| 7,622,820 B1 * | 11/2009 | Prodic et al. | .................... | 307/31 |
| 7,825,642 B1 * | 11/2010 | Young et al. | ................... | 323/224 |
| 2004/0046535 A1 * | 3/2004 | Duffy et al. | .................... | 323/283 |
| 2004/0189272 A1 * | 9/2004 | Matsuura et al. | ............. | 323/283 |
| 2005/0237042 A1 * | 10/2005 | Yoshida et al. | ................ | 323/282 |
| 2006/0022657 A1 * | 2/2006 | Sutardja et al. | ............... | 323/283 |
| 2006/0152204 A1 * | 7/2006 | Maksimovic et al. | ........ | 323/284 |
| 2006/0220630 A1 * | 10/2006 | Xiao et al. | ..................... | 323/283 |
| 2006/0261794 A1 * | 11/2006 | May | ............................. | 323/283 |
| 2007/0085521 A1 * | 4/2007 | Nagai | ........................... | 323/283 |
| 2008/0054869 A1 * | 3/2008 | Chang | .......................... | 323/283 |
| 2008/0100393 A1 * | 5/2008 | Nuytkens et al. | ............. | 332/100 |
| 2008/0136391 A1 * | 6/2008 | Xiao et al. | ..................... | 323/283 |
| 2008/0252277 A1 * | 10/2008 | Sase et al. | ..................... | 323/283 |
| 2008/0278123 A1 * | 11/2008 | Mehas et al. | .................. | 323/266 |
| 2008/0315852 A1 * | 12/2008 | Jayaraman et al. | ........... | 323/285 |
| 2009/0267582 A1 * | 10/2009 | Prodic et al. | .................. | 323/283 |
| 2009/0309567 A1 * | 12/2009 | Morroni et al. | ................ | 323/283 |
| 2011/0316508 A1 * | 12/2011 | Cheng et al. | .................. | 323/282 |

* cited by examiner

Primary Examiner — Jeffrey Sterrett
Assistant Examiner — Nusrat Quddus
(74) Attorney, Agent, or Firm — McDermott Will & Emery LLP (57) ABSTRACT

A dynamically-compensated controller may generate a switching signal for a DC power supply. The controller may include a feedback circuit having a first analog-to-digital converter and a separate analyzer circuit for generating information indicative of performance characteristics of the feedback circuit based on information about the results of a test perturbation signal at an output of the DC power supply. The analyzer circuit may include a DC removal circuit configured to substantially filter out the DC component of the results of the test perturbation signal at the output of the DC power supply, a frequency translation circuit configured to translate the frequency of the filtered signal to a frequency that is lower than the frequency of the test perturbation signal, and a second analog-to-digital converter different from the first analog-to-digital converter that is configured to generate a signal representative of one or more of the characteristics of the filtered signal.

29 Claims, 4 Drawing Sheets

DYNAMICALLY-COMPENSATED CONTROLLER

BACKGROUND

1. Technical Field

This disclosure relates to power control systems and, more particularly, to dynamically-compensated controllers used in DC power supplies.

2. Description of Related Art

DC power supplies may regulate their output by varying a switching signal that is used to controllably deliver energy to their output based on a comparison of the output and a target value.

Feedback circuits may be used to generate the switching signal. These feedback circuits may be optimized to maximize the speed at which they compensate for changes in the load and/or source supply, without instability.

The characteristics of the components which are used in the feedback circuit and elsewhere can vary due to variations in manufacturing processes, temperature changes, and/or aging. These component variations, in turn, can diminish the performance of the feedback circuit, thus reducing the speed at which it compensates for changes in the load and/or source supply and/or its stability.

One approach to addressing this problem is to design the feedback circuit to provide adequate performance, notwithstanding anticipated changes in component value. Such designs, however, often resolve in performance compromises and/or a requirement for an output filtering capacitance that is larger than what would otherwise be needed. It may also be difficult to anticipate the nature of load transients and, as a result, to provide a design that adequately handles them.

Another approach to addressing this problem is to dynamically compensate the feedback circuit for these changes. During operation of the feedback circuit, a perturbation signal of known characteristics may be injected into the feedback loop, causing a corresponding perturbation in the output of the DC supply. The perturbation in the output may be compared to the injected perturbation. Based on this comparison, one or more performance characteristics of the feedback circuit may be determined. Performance characteristics of the feedback circuit may then be dynamically optimized as needed.

Accurately measuring the perturbation on the output which is caused by the injected perturbation, however, can be challenging. For example, it may be difficult to distinguish the output perturbation from noise on the output of the supply, such as noise caused by switching ripple and/or load transients. The DC output of the power supply may also be very substantial in comparison to the output perturbation. This may make it difficult to accurately measure characteristics of the output perturbation, without very sensitive circuitry, such as a high resolution analog-to-digital converter. Such devices can be expensive and/or require significant chip real estate.

SUMMARY

A dynamically-compensated controller may generate a switching signal for a DC power supply having an output. The controller may include a feedback circuit. The feedback circuit may be configured to generate the switching signal based on a feedback signal that is indicative of the output of the DC power supply, adjust one or more performance characteristics of the feedback circuit based on one or more optimization signals, and perturb the switching signal based on a test perturbation signal. The controller may include an optimizer circuit configured to generate the optimization signals based on information indicative of the performance characteristics of the feedback circuit. The controller may include a test perturbation signal generator circuit configured to generate the test perturbation signal. The controller may include an analyzer circuit configured to generate the information indicative of the performance characteristics of the feedback circuit based on a signal representative of the output of the DC power supply and information about the test perturbation signal. The analyzer circuit may include a DC removal circuit configured to substantially remove the DC component of the signal representative of the DC output of the power supply so as to produce a filtered output signal representative of the test perturbation on the output of the DC power supply caused by the test perturbation signal without the DC component. The analyzer circuit may include a frequency translation circuit configured to translate the frequency of the filtered output signal to a frequency that is lower than the frequency of the test perturbation signal.

The feedback circuit may include a first analog-to-digital converter configured to generate a digital signal representative of the output of the DC power supply. The analyzer circuit may include a second analog-to-digital converter different from the first analog-to-digital converter configured to generate a digital signal representative of one or more characteristics of the filtered output signal.

These, as well as other components, steps, features, objects, benefits, and advantages, will now become clear from a review of the following detailed description of illustrative configurations.

BRIEF DESCRIPTION OF DRAWINGS

The drawings disclose illustrative configurations. They do not set forth all configurations. Other configurations may be used in addition or instead. Details that may be apparent or unnecessary may be omitted to save space or for more effective illustration. Conversely, some configurations may be practiced without all of the details that are disclosed. When the same numeral appears in different drawings, it is intended to refer to the same or like components or steps.

DETAILED DESCRIPTION OF ILLUSTRATIVE CONFIGURATIONS

Illustrative configurations are now discussed. Other configurations may be used in addition or instead. Details that may be apparent or unnecessary may be omitted to save space or for a more effective presentation. Conversely, some configurations may be practiced without all of the details that are disclosed.

Figure 1:
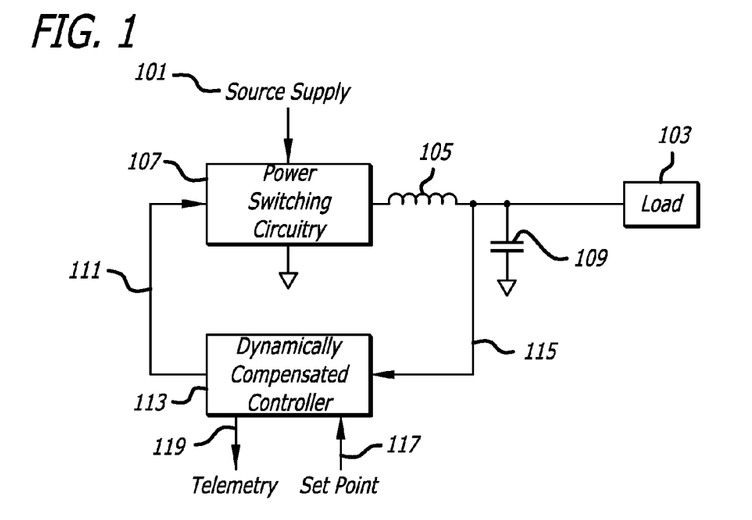
FIG. 1 illustrates components of a DC-to-DC buck converter that includes a dynamically-compensated controller.

FIG. 1 illustrates components of a DC-DC buck converter that includes a dynamically-compensated controller. As illustrated in FIG. 1, a source supply 101 may controllably deliver energy to a load 103 through an inductance 105 under the control of power switching circuitry 107. Filtering capacitance 109 may also be used.

The power switching circuitry 107 may be controlled by a switching signal 111 that may be generated by a dynamically-compensated controller 113. A feedback signal 115 that is indicative of the power supply output may be delivered to the dynamically-compensated controller 113, along with a set point signal 117 indicative of the desired output of the power supply. Together these elements form a closed loop which employs negative feedback to regulate the energy delivered to the load (hereafter referred to as "the loop").

The power switching circuitry 107 may include gates and gate drivers that are configured to connect the input through the inductance 105 to the source supply 101 or to ground (or a negative source supply) based on the state of the switching signal 111. The dynamically-compensated controller 113 may control the switching signal 111 so as to cause an amount of energy to be delivered by the inductance 105 which is appropriate for the load 103, based on the feedback signal 115 and the set point signal 117.

The dynamically-compensated controller 113 may be configured to generate the switching signal 111 in any of a variety of forms. For example, the switching signal 111 may be at a fixed frequency with a duty cycle that varies based on the needs of the load 103. In other configurations, the switching signal 111 may have a fixed pulse on-time, with a pulse frequency that is varied depending upon the needs of the load 103. In still other configurations, the switching signal 111 may vary both in its frequency, duty cycle, and/or on time.

The dynamically-compensated controller 113 may be configured to dynamically adjust one or more of its performance characteristics to compensate for changes in the value of one or more of its components, for changes in the value of one or more other components, and/or for transients in the load 103. For example, the dynamically-compensated controller may be configured to adjust such performance characteristics as a gain, phase, bandwidth, or any combination of these or other performance characteristics. The dynamically-compensated controller 113 may include digital circuitry which processes digital signals. All or portions of the dynamically-compensated controller 113 may be contained on a single integrated circuit.

The dynamically-compensated controller 113 may be configured to provide one or more telemetry signals 119 in either digital or analog format. The telemetry signals 119 may include signals indicative of the output voltage, the output current, the gain, phase, bandwidth or other characteristics of the dynamically-compensated controller 113, and/or any other type of information about the power supply and/or its operation.

Figure 2:
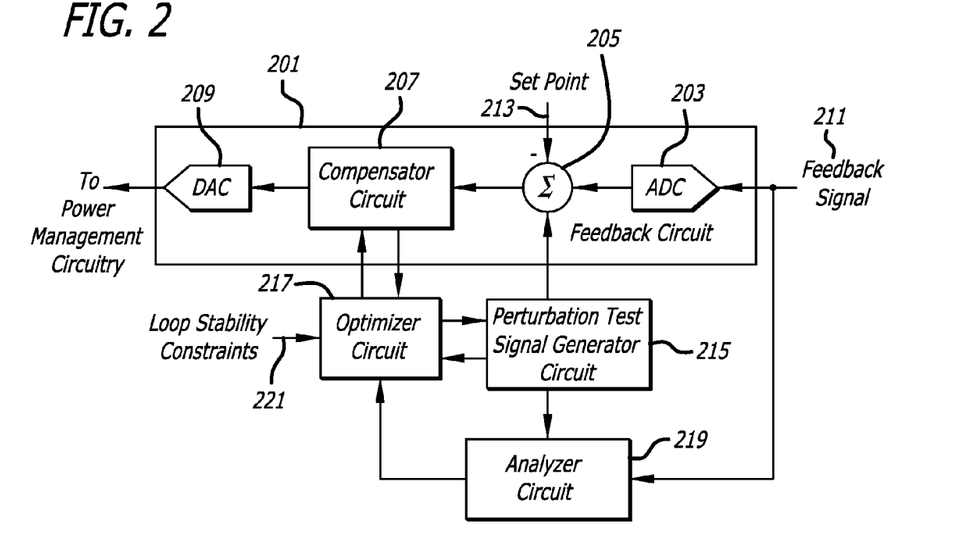
FIG. 2 is a block diagram of a dynamically-compensated controller for generating a switching signal for a DC power supply.

FIG. 2 is a block diagram of a dynamically-compensated controller for generating a switching signal for a DC power supply. The controller may be used for the dynamically-compensated controller 113 illustrated in FIG. 1, or the dynamically-compensated controller 113 illustrated in FIG. 1 may be implemented with a controller of a different type. The dynamically-compensated controller illustrated in FIG. 2 may be used in connection with other types of switching DC power supplies, such as DC-to-DC boost, buck boost, or linear power supplies, or AC-to-DC switching power supplies.

The dynamically-compensated controller illustrated in FIG. 2 may include a feedback circuit 201. The feedback circuit may be configured to generate a switching signal based on a feedback signal that is indicative of the output of the DC power supply. The feedback circuit may be configured to adjust one or more performance characteristics of the feedback circuit based on one or more optimization signals. The feedback circuit may be configured to perturb the switching signal based on a test perturbation signal.

Many different types of components may be used in the feedback circuit 201. In one configuration, the feedback circuit 201 may include an analog-to-digital converter 203, a summer 205, a compensator circuit 207, and a digital-to-analog converter 209.

The analog-to-digital converter 203 may be configured to convert a feedback signal 211 that is indicative of the output of the DC power supply into a digital signal. The analog-to-digital converter 203 may be configured to sample the feedback signal 211 at many times the frequency of the switching signal which is used in the power supply, such as between 2 and 4 times the frequency of the switching signal. The analog-to-digital converter 203 may have a resolution that is appropriate for the desired tolerance in the output of the DC power supply, such as between 10 and 12 bits.

The summer 205 may have several inputs. For example, the summer 205 may receive a set point signal 213 that is indicative of the desired output of the DC power supply. The summer 205 may receive the digital output of the analog-to-digital converter 203, as well as a test perturbation signal from a test perturbation signal generator 215. The summer 205 may be configured to add the test perturbation signal from the test perturbation signal generator 215 to the output of the analog-to-digital converter 203, and to subtract the set point signal 213 from this sum. The summer 205 may have additional or different inputs. The summer 205 may be a digital circuit configured to process digital input and output signals.

The output of the summer 205 may be delivered to the compensator circuit 207. The compensator circuit 207 may be configured to generate characteristics of the switching signal 111 so that the switching signal 111 is appropriate based on the output of the summer 205. For example, when the output of the summer 205 is negative, the compensator circuit 207 may be configured to cause the switching signal to increase the duty cycle. Conversely, when the output from the summer 205 is positive, the compensator circuit 207 may be configured to cause the switching signal 111 to decrease the duty cycle.

Various algorithms may be implemented by the compensator circuit 207. For example, the compensator circuit 207 may be configured to apply a proportional, integral, and derivative ("PID") function to the output of the summer 205, a sub-combination of one of these functions, one or more different functions, or any combination of these.

The compensator circuit 207 may be configured to adjust one or more of these functions based on one or more optimization signals received from an optimizer circuit 217. For example, the compensator circuit 207 may be configured to scale a proportional function, an integral function, and a derivative function, each based on one of the optimization signals from the optimizer circuit 217. The compensator circuit 207 may be a digital circuit configured to input and output digital signals.

The output of the compensator circuit 207 may be delivered to the digital-to-analog converter 209. The digital-toanalog converter 209 may be configured to convert a digital output from the compensator circuit 207 into an analog signal and, in particular, into the switching signal 111. The exact nature of the analog output of the digital-to-analog converter 209 may depend upon the type of the switching signal 111 which is desired for the particular DC power supply in which the dynamically-compensated controller is being used. When the switching signal 111 is to be at a fixed frequency with a variable duty cycle, for example, the digital-to-analog converter 209 may be configured to generate a pulse-width modulated output, based on the input from the compensator circuit 207. In other configurations, a constant on time switching signal may be desired, or some other timing might be desired. In these cases, the digital-to-analog converter 209 may be configured accordingly. The compensator circuit 207 may also be appropriately configured to deliver the needed information to the digital-to-analog converter 209.

The test perturbation signal generator 215 may be configured to generate the test perturbation signal. A broad variety of different types of test perturbation signals may be used. For example, the test perturbation signal may substantially be a sign wave signal. In other configurations, it may have a different wave shape, such as a saw tooth, or square wave.

The amplitude of the test perturbation signal may be small, as compared to the target output of the power supply. For example, the amplitude of the test perturbation signal may be less than 0.1 percent of the target output of the DC supply. The amplitude of the test perturbation signal may, in certain configurations, be controlled by a control signal from the optimizer circuit 217.

The frequency of the test perturbation signal may also vary. In some configurations, for example, the test perturbation signal frequency may be between 10 and 100 kilohertz. The frequency of the test perturbation signal may be controlled by a control signal from the optimizer circuit 217.

The test perturbation signal generator 215 may be configured to generate one or more clock signals that are synchronous with the test perturbation signal. For example, the test perturbation signal generator 215 may be configured to generate an in phase "I" clock that is substantially in phase with the test perturbation signal, as well as a quadrature phase "Q" clock that is substantially 90 degrees out of phase with the test perturbation signal.

Figure 3:
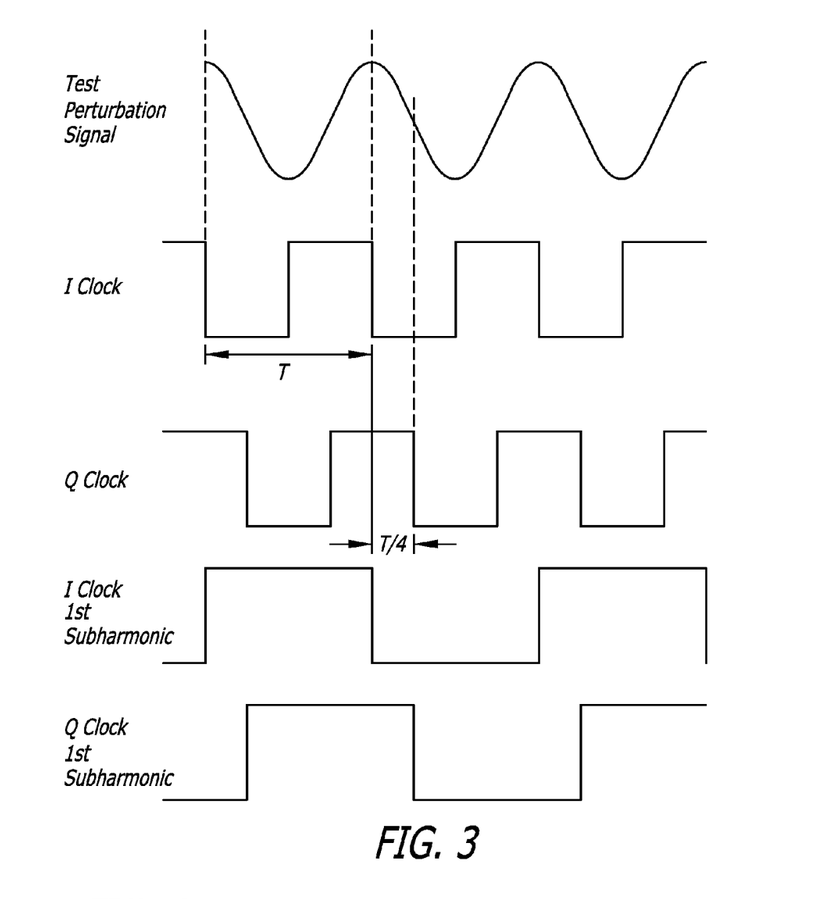
FIG. 3 illustrates possible phase relationships between a test perturbation signal, an in phase "I" clock, and a quadrature phase "Q" clock.

FIG. 3 illustrates possible phase relationships between a test perturbation signal, an in phase "I" clock, and a quadrature phase "Q" clock. As illustrated in FIG. 3, the rising and falling edges of the in phase "I" clock may be synchronous with the peak and minimum values of the test perturbation signal, while the rising and falling edges of the quadrature phase "Q" clock may be synchronous with the zero crossing of the test perturbation signal, i.e., shifted in phase by substantially 90 degrees from the in phase "I" clock.

Returning to FIG. 2, an analyzer circuit 219 may be configured to generate information indicative of the performance characteristics of the loop based on the feedback signal 211 and information about the test perturbation signal that may be received from the signal generator 215, such as the in phase "I" clock and the quadrature phase "Q" clock. As illustrated in FIG. 2, the analyzer circuit may process the feedback signal along a pathway that is separate from and auxiliary to the pathway the feedback signal 211 travels through the feedback circuit 201, including the pathway to the analog-to-digital converter 203. As also illustrated in FIG. 2, the analyzer circuit 219 may not use the signal from or otherwise rely upon the output of the analog-to-digital converter 203.

The optimizer circuit 217 may be configured to generate the optimization signals based on information indicative of the performance characteristics of the feedback circuit that is received from the analyzer circuit 219. For example, the optimizer circuit may be configured to generate scaling factors for the gain, phase, bandwidth, or other performance characteristics of the feedback circuit 201. These optimization signals may be delivered to the compensator circuit 207. The compensator circuit 207 may deliver information about the current settings of these performance characteristics to the optimizer circuit 217, so that the optimizer circuit may to determine what changes are needed.

One or more loop-stability constraints 221 may be delivered to the optimizer circuit 217. These constraints may be indicative of constraints under which the optimizer circuit 217 should operate when generating the optimizing signals that it delivers to the compensator circuit 207. Examples of optimizer constraints are the maximum allowable loop phase lag at the frequency at which the loop gain is approximately 1, i.e. phase margin; the maximum allowable loop gain at the frequency at which the loop phase is lagging by approximately 180 degrees, i.e. gain-margin; and the minimum and/or maximum frequencies at which the loop gain is approximately 1.

The optimizer circuit 217 may be configured to direct test perturbation signal generator 215 to generate test perturbation signals that sweep across a frequency spectrum. It may be configured to do so for the purpose of identifying the crossover frequency at which the loop gain of the feedback circuit 201, as received from the analyzer circuit 219, is approximately 1. The optimizer circuit 217 may be configured to generate the optimization signals based on the phase information that is received from the analyzer circuit 219 at this cross-over frequency, as well as based on the cross-over frequency. The optimizer circuit 217 may contain digital circuitry that inputs and outputs digital signals.

Figure 4:
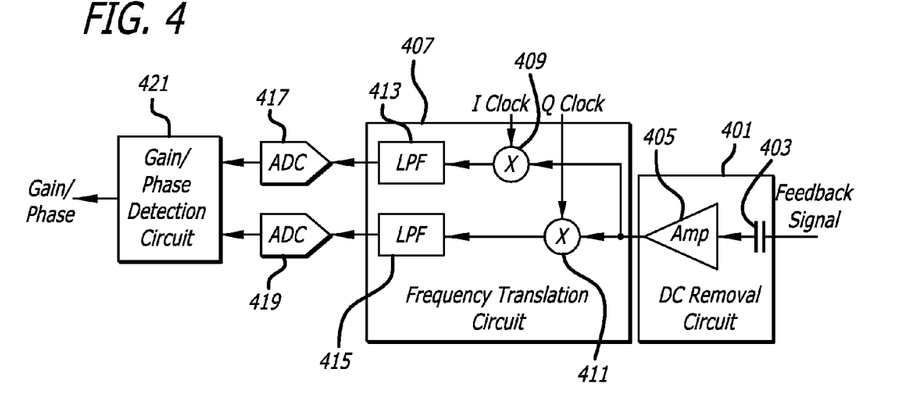
FIG. 4 is a block diagram of an analyzer circuit that utilizes dual mixers.

FIG. 4 is a block diagram of an analyzer circuit that utilizes dual mixers. This circuit may be used in the dynamically-compensated controller illustrated in FIG. 2 as the analyzer circuit 219. However, the analyzer circuit 219 in FIG. 2 may use circuitry other than as illustrated in FIG. 4. Similarly, the analyzer circuit illustrated in FIG. 4 may be used in circuits other than the dynamically-compensated controller illustrated in FIG. 2.

The analyzer circuit in FIG. 4 may include a DC removal circuit 401. The DC removal circuit 401 may be configured to substantially remove the DC component from the feedback signal so as to produce a filtered output signal that is representative of the test perturbation on the output of the DC power supply that is caused by the test perturbation signal, without this DC component.

A broad variety of different components may be used for the DC removal circuit 401. In one configuration, for example, the DC removal circuit may include a high pass filter configured to block the DC component of the feedback signal. In one configuration, the high pass filter may include or consist of a capacitance 403. The output of the high pass filter may be delivered to an amplifier 405 that may be configured to buffer and/or amplify this signal.

The filtered output signal from the DC removal circuit 401 may be delivered to a frequency translation circuit 407. The frequency translation circuit 407 may be configured to translate the frequency of the filtered output signal from the DC removal circuit 401 to a frequency that is lower than the frequency of the test perturbation signal.

A broad variety of different approaches may be taken by the frequency translation circuit 407 to accomplish this frequency translation. In one configuration, the frequency translation circuit may employ homodyne detection to convert the filtered output signal then into its baseband quantities. Through the use of homodyne detection, the frequency translation circuit 407 may generate a DC voltage that is proportional to one or more of the performance characteristics of the feedback circuit 201, such as the phase, gain, and/or bandwidth of the loop.

A broad variety of different approaches may be taken by the frequency translation circuit 407 to implement homodyne detection. In one configuration, a first mixer 409 may be configured to mix the filtered output signal with the in phase "I" clock from the test perturbation signal generator 215. A second mixer 411 may be configured to mix the filtered output signal with the quadrature phase "Q" clock from the test perturbation signal generator 215. The output of the first mixer 409 may be filtered by a first low-pass filter 413, while the output from the second mixer 411 may be filtered by a second low-pass filter 415. The low-pass filters 413 and 415 may be configured with a low cut-off frequency so as to remove all noise and load transients from the filtered feedback signal. In one configuration, for example, the frequency of the test perturbation signal may be approximately 100 kilohertz, while the low-pass filters 413 and 415 may have a cut-off frequency of approximately 10 kilohertz.

The output of the first low-pass filter 413 may be delivered to a first analog-to-digital converter 417, while the output of the second low-pass filter 415 may be delivered to a second analog-to-digital converter 419. The analog-to-digital converters 417 and 419 may be configured to convert their respective analog inputs into a digital signal. The resolution of the analog-to-digital converters 417 and 419 may only be very moderate, such as between 6 and 8 bits. This may be sufficient because the test perturbation signal may be decoupled from the DC output of the power supply by the DC removal circuit 401.

The speed of the analog-to-digital converters 417 and 419 may be relatively slow, e.g. approximately 20,000 kilosamples per second. This may be adequate because the changes for which dynamic compensation is being provided may also be relatively slow.

The analog-to-digital converters 417 and 419 may be completely separate from the analog-to-digital converter 203 that is used in the feedback circuit 201.

The analyzer circuit illustrated in FIG. 4 may include a gain/phase detection circuit 421. This circuit may be configured to receive the digital signals from the analog-to-digital converters 417 and 419 and convert them into information indicative of the gain and phase of the loop through the application of one or more algorithms.

A broad variety of algorithms may be used. For example, the gain of the loop may be computed by calculating the square root of the sum of the square of the output from the analog-to-digital converter 417 and the square of the output from the analog-to-digital converter 419. The phase of the loop, for example, may be computed by calculating the arctangent of the output from the analog-to-digital converter 417 divided by the output from the analog-to-digital converter 419.

Although the gain/phase detection circuit 421 has thus-far been described as determining the gain and phase of the loop, other configurations of this detection circuit 421 may be configured to determine only the gain or only the phase.

Figure 5:
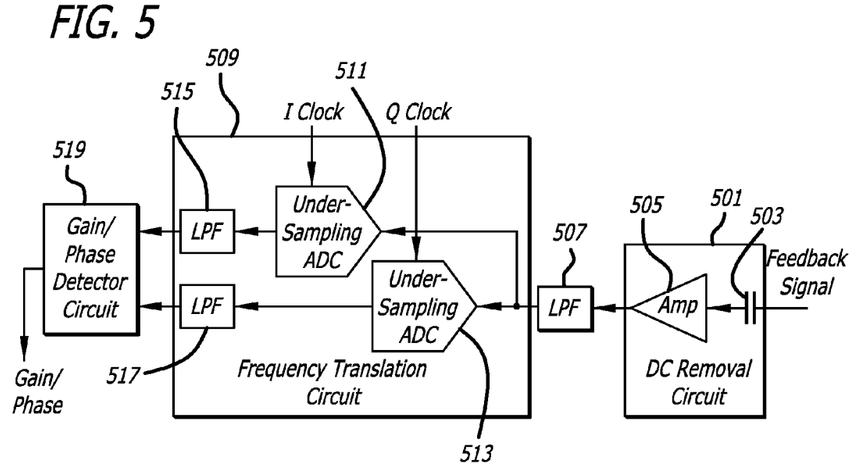
FIG. 5 is a block diagram of an analyzer circuit that utilizes dual under-sampling analog-to-digital converters.

FIG. 5 is a block diagram of an analyzer circuit that utilizes dual under-sampling analog-to-digital converters. The analyzer circuit illustrated in FIG. 5 may be used in the dynamically-compensated controller illustrated in FIG. 2 as the analyzer circuit 219 or in any other type of circuit.

As illustrated in FIG. 5, the analyzer circuit may include a DC removal circuit 501. The DC removal circuit 501 may function like and/or contain any of the components that are described above in connection with the DC removal circuit 401 in FIG. 4, such as a capacitance 503 and an amplifier 505. The filtered output signal from the DC removal circuit 501 may be delivered to a low-pass filter 507. This low-pass filter may be an anti-aliasing filter configured to remove artifacts from the filtered output signal. For example, it may have a cut-off frequency that is between the maximum frequency of the test perturbation signal and the switching frequency of the DC/DC converter.

The output of the low-pass filter 507 may be delivered to a frequency translation circuit 509. The frequency translation circuit 509 may be configured to translate the frequency of the filtered output signal from the low-pass filter 507 to a frequency that is lower than the frequency of the test perturbation signal.

A broad variety of circuitry may be used for this purpose. In one configuration, the frequency translation circuit 509 may include an under-sampling analog-to-digital converter 511 which may be configured to sample the output from the low-pass filter 507 in synchronism with the in phase "I" clock from the test perturbation signal generator 215. Similarly, an under-sampling analog-to-digital converter 513 may be configured to sample the output from the low-pass filter 507 in synchronism with the quadrature phase "Q" clock from the test perturbation signal generator 215. The sampling frequency of the under-sampling analog-to-digital converters 511 and 513 may be a subharmonic of the test perturbation frequency or it may be identical to the test perturbation frequency. For example, if the test perturbation frequency is 100 kilohertz, the sampling frequency of the undersampling analog-to-digital converters 511 and 513 may be 100 kilohertz, 50 kilohertz, 33.3 kilohertz, 25 kilohertz, and so on.

The outputs from the under-sampling analog-to-digital converters 511 and 513 may be delivered, respectively, to digital low-pass filter 515 and 517. These low-pass filters may have cut-off frequencies that are comparable to or significantly lower than the low-pass filters 413 and 415 discussed above in connection with FIG. 4. Other characteristics of the low-pass filters 515 and 517 may vary significantly from low-pass filters 413 and 415 because they are implemented in the digital domain instead of the analog domain. The outputs from the low-pass filters 515 and 517 may be delivered to a gain/phase detector circuit 519. This circuit may function and implement algorithms in the same way as were discussed above in connection with the gain/phase detection circuit 421, and may similarly be configured to detect performance characteristics of the loop other than gain and phase, such as only gain, only phase, bandwidth, and/or any combination of performance criteria.

The low-pass filters 515 and 517 and the gain/phase detector circuit 519 may be implemented entirely with digital circuitry and may receive and deliver only digital signals.

Figure 6:
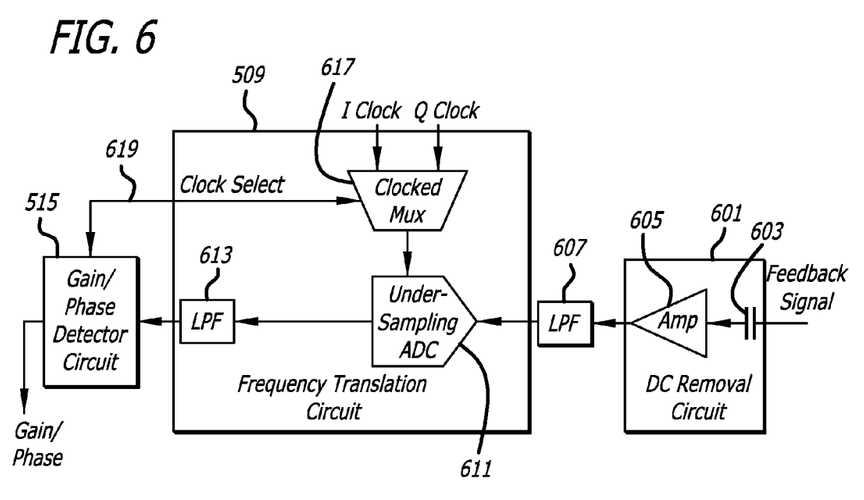
FIG. 6 is a block diagram of an analyzer circuit that utilizes a single, time-multiplexed, under-sampling analog-to-digital converter.

FIG. 6 is a block diagram of an analyzer circuit that uses a single, time-multiplexed under-sampling analog-to-digital converter. This analyzer circuit may be used in FIG. 2 as the analyzer circuit 219 or in connection with any other type of circuit.

As illustrated in FIG. 6, the analyzer circuit may include a DC removal circuit 601 which may include a capacitance 603 and an amplifier 605; a low-pass filter 607, a frequency translation circuit 609 which may include an under-sampling analog-to-digital converter 611 and a low-pass filter 613, and a gain/phase detector circuit 615. Each of these components may be configured and may function in the same way as their corresponding components in FIG. 5 as discussed above.

One difference, however, may be in the frequency translation circuit 609 and the gain/phase detector circuit 615. In the frequency translation circuit 609, for example, a clock multiplexer 617 may be included. The clock multiplexer 617 may receive the in-phase "I" clock and the quadrature phase "Q" clock from the test perturbation signal generator 215. Under the control of a clock select signal 619, which may be generated by the test perturbation signal generator 215 in synchronism with the test clock signal, the clocked multiplexer 617 may alternately deliver an output to the under-sampling analog-to-digital converter 611 that switches between the in-phase "I" clock and the quadrature phase "Q" clock.

The gain/phase detector circuit 615 may correspondingly contain one or more buffers so as to hold the averaged value of the filtered output signal that was under-sampled during one of the clock phases (e.g., the in phase "I" clock), while the filtered output signal is being under-sampled and filtered during the other synchronous clock phase (e.g., the quadrature phase "Q" clock). The gain/phase detector circuit 615 may be configured to do this in synchronism with the clock select signal 619. The gain/phase detector circuit 615 may be configured to then draw upon both of these values in order to calculate the gain and phase of the loop, again in synchronism with the clock select signal 619. The clock select signal 619 alternates between the two clock phases I and Q at such a rate so as to allow enough time for the test perturbation to completely propagate through the undersampling analog-to-digital converter 611 and the low-pass filter 613.

A distinct advantage of the mux'd approach show in FIG. 6 (besides requiring only one under-sampling analog-to-digital converter and one low-pass filter) is that the requirement to match the conversion gain of the I and Q analog-to-digital converters to some degree is automatically satisfied. This is not the case for the approaches shown in FIGS. 4 and 5. To the extent that the conversion gain of the I and Q analog-to-digital converters 417 and 419 in FIG. 4 and undersampling analog-to-digital converters 511 and 513 in FIG. 5 is not matched, there exists the potential for an additional error to be introduced into the computation of the loop-gain and loop-phase.

Although not shown, the first mixer 409, the low-pass filter 413, and the analog-to-digital converter 417 may similarly be multiplexed between the in-phase "I" clock cycle and the quadrature phase "Q" clock, so as to eliminate the need for a duplicate instance of each device.

The clock multiplexer 617 may consist of entirely digital components and operate on entirely digital signals.

The components, steps, features, objects, benefits and advantages that have been discussed are merely illustrative. None of them, nor the discussions relating to them, are intended to limit the scope of protection in any way. Numerous other configurations are also contemplated, including configurations that have fewer, additional, and/or different components, steps, features, objects, benefits and advantages. The components and steps may also be arranged and ordered differently.

Figure 7:
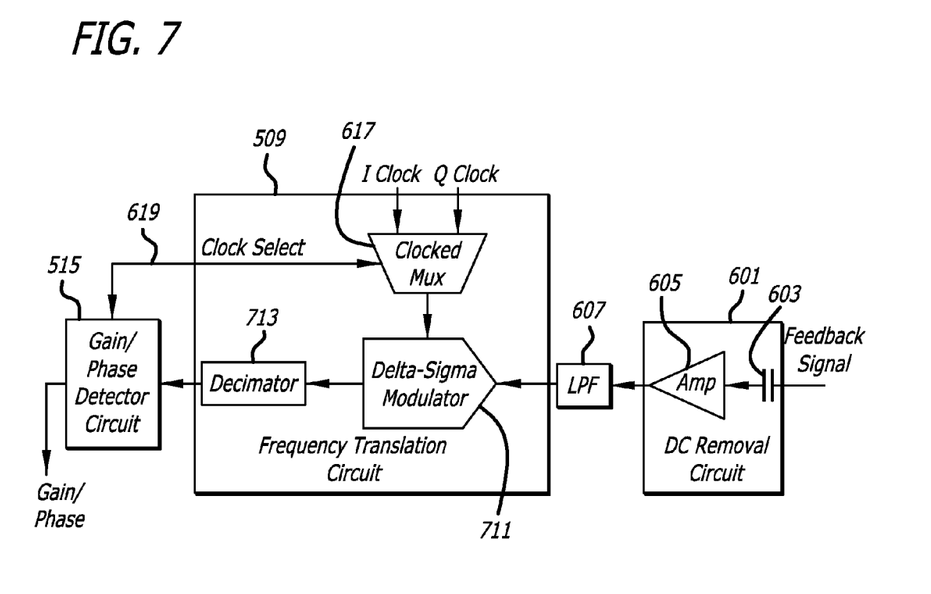
FIG. 7 is a block diagram of an analyzer circuit that utilizes a single, time-multiplexed, under-sampling delta-sigma modulator.

FIG. 7 depicts a variation of the embodiment shown in FIG. 6. The under-sampling analog-to-digital converter 611 and low-pass filter 613 have been replaced with a delta-sigma modulator 711 and a decimator 713. Acting together, the delta-sigma modulator and the decimator may perform the same function as the undersampling analog-to-digital converter and low-pass filter. The delta-sigma modulator can be of any type and is driven by I and Q clocks at a frequency equal to the test perturbation or a subharmonic of the test perturbation frequency. The decimator may also be of any type and converts the output of the delta-sigma modulator into a digital word that represents the average value of the I or Q component of the detected test perturbation. The resolution of the digital word produced by the decimator may be increased by increasing the amount of time over which the I or Q component of the test perturbation is averaged. Hence, an increase in the resolution of the analog-to-digital conversion function simultaneously results in a lower cut-off frequency of the low-pass filter function.

The term "coupled" encompasses both direct and indirect coupling. For example, the term "coupled" encompasses the presence of intervening circuitry between two points that are coupled The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. A dynamically-compensated controller for generating a switching signal for a DC power supply having as output comprising:
    a feedback circuit configured to:
        generate the switching signal based on a feedback signal that is indicative of the output of the DC power supply;
        adjust one or more performance characteristics of the feedback circuit based on one or more optimization signals; and
        perturb the switching signal based on a test perturbation signal;
    an optimizer circuit configured to generate the optimization signals based on information indicative of the performance characteristics of the feedback circuit;
    a test perturbation signal generator circuit configured to generate the test perturbation signal; and
    an analyzer circuit configured to generate the information indicative of the performance characteristics of the feedback circuit based on a signal representative of the output of the DC power supply and information about the test perturbation signal, the analyzer circuit including:
        a DC removal circuit configured to substantially remove the DC component of the signal representative of the DC output of the power supply so as to produce a filtered output signal representative of the test perturbation on the output of the DC power supply caused by the test perturbation signal without the DC component; and
        a frequency translation circuit configured to translate the frequency of the filtered output signal to a frequency that is lower than the frequency of the test perturbation signal.

2. The dynamically-compensated controller of claim 1 wherein the performance characteristics include a gain margin and a phase margin of the feedback circuit.

3. The dynamically-compensated controller of claim 2 wherein the performance characteristics include a loop unity-gain bandwidth of the feedback circuit.

4. The dynamically-compensated controller of claim 1 wherein the feedback circuit is configured to provide an integrating function, a derivative function, and a proportional function and to scale each in accordance with one of the optimization signals.

5. The dynamically-compensated controller of claim 1 wherein the analyzer circuit includes an analog-to-digital converter.

6. The dynamically-compensated controller of claim 5 wherein the switching signal has a frequency and wherein the analog-to-digital converter is configured to sample at a frequency that is less than the frequency of the switching signal.

7. The dynamically-compensated controller of claim 5 wherein the feedback circuit includes an analog-to-digital converter which is separate and distinct from the analog-to-digital converter in the analyzer circuit.

8. The dynamically-compensated controller of claim 5 wherein the analyzer circuit includes two analog-to-digital converters.

9. The dynamically-compensated controller of claim 1 wherein the frequency translation circuit performs homodyne detection.

10. The dynamically-compensated controller of claim 9 wherein the test perturbation signal generator is configured to generate an in phase clock that is substantially in phase with the test perturbation signal and a quadrature phase clock that is substantially 90 degrees out of phase with the test perturbation signal and wherein the frequency translation circuit is configured to perform homodyne detection based on the in phase clock and the quadrature phase clock.

11. The dynamically-compensated controller of claim 10 wherein the frequency translation circuit includes:
   a first mixer configured to mix the in phase clock with the filtered output signal;
   a first low-pass filter configured to filter the output of the first mixer;
   a second mixer configured to mix the quadrature phase clock with the filtered output signal;
   a second low-pass filter configured to filter the output of the second mixer; and
   a gain/phase detector configured to generate information indicative of the gain and phase of the feedback circuit based on the outputs of the first and second low-pass filters.

12. The dynamically-compensated controller of claim 10 wherein the frequency translation circuit includes:
   a multiplexer configured to produce a time-multiplex output alternately representing the in phase clock and the quadrature phase clock;
   a mixer configured to mix the output of the multiplexer with the filtered output signal;
   a low-pass filter configured to filter the output of the mixer; and
   a gain/phase detector configured to generate information indicative of the gain and phase of the feedback circuit based on the output of the low-pass filter.

13. The dynamically-compensated controller of claim 10 wherein the frequency translation circuit includes:
   a first under-sampling analog-to-digital converter configured to under sample the filtered output signal based on the in phase clock;
   a first low-pass filter configured to filter the output of the first under-sampling analog-to-digital converter;
   a second under-sampling analog-to-digital converter configured to under sample the filtered output signal based on the quadrature phase clock;
   a second low-pass filter configured to filter the output of the first under-sampling analog-to-digital converter; and
   a gain/phase detector configured to generate information indicative of the gain and phase of the feedback circuit based on the outputs of the first and second low-pass filters.

14. The dynamically-compensated controller of claim 10 wherein the frequency translation circuit includes:
   a multiplexer configured to produce a time-multiplexed output alternately representing the in phase clock and the quadrature phase clock; and
   an under-sampling analog-to-digital converter configured to under sample the output of the multiplexer;
   a low-pass filter configured to filter the output of the under-sampling analog-to-digital converter; and
   a gain/phase detector configured to generate information indicative of the gain and phase of the feedback circuit based on the output of the low-pass filter.

15. The dynamically-compensated controller of claim 1 wherein feedback circuit, the optimizer circuit, the test perturbation signal generator circuit, and the analyzer circuit are each configured to process digital signals.

16. The dynamically-compensated controller of claim 15 wherein feedback circuit, the optimizer circuit, the test perturbation signal generator circuit, and the analyzer circuit are all on a single integrated circuit.

17. An analyzer circuit for generating information indicative of performance characteristics of a feedback circuit in a DC power supply based on information about a test perturbation signal and based on a signal representative of the results of that test perturbation signal at an output of the DC power supply comprising:
   a DC removal circuit configured to substantially remove the DC component of the signal representative of the results of the test perturbation signal at the output of the DC power supply so as to produce a filtered output signal representative of the test perturbation on the output of the power supply caused by the test perturbation signal without the DC component; and
   a frequency translation circuit configured to translate the frequency of the filtered output signal to a frequency that is lower than the frequency of the test perturbation signal.

18. The analyzer circuit of claim 17 wherein the analyzer circuit includes an analog-to-digital converter.

19. The analyzer circuit of claim 17 wherein the DC power supply has a switching signal having a frequency and wherein the analog-to-digital converter is configured to sample at a frequency that is less than the frequency of the switching signal.

20. The analyzer circuit of claim 17 wherein the analyzer circuit includes two analog-to-digital converters.

21. The dynamically-compensated controller of claim 17 wherein the frequency translation circuit performs homodyne detection.

22. The dynamically-compensated controller of claim 1 wherein the analyzer circuit is configured to process digital signals and is on a single integrated circuit.

23. A dynamically-compensated controller for generating a switching signal for a DC power supply having as output comprising:

a feedback circuit including a first analog-to-digital converter configured to generate a digital signal representative of the output of the DC power supply, the feedback circuit being configured to:
  generate the switching signal based on the digital signal;
  adjust one or more performance characteristics of the feedback circuit based on one or more optimization signals; and
  perturb the switching signal based on a test perturbation signal;
an optimizer circuit configured to generate the optimization signals based on information indicative of the performance characteristics of the feedback circuit;
a test perturbation signal generator circuit configured to generate the test perturbation signal; and
an analyzer circuit configured to generate the information indicative of the performance characteristics of the feedback circuit based on a signal representative of the output of the DC power supply and information about the test perturbation signal, the analyzer circuit including:
  a DC removal circuit configured to substantially remove the DC component of the signal representative of the DC output of the DC power supply so as to produce a filtered output signal representative of the test perturbation on the output of the power supply caused by the test perturbation signal without the DC component; and
  a second analog-to-digital converter different from the first analog-to-digital converter configured to generate a digital signal representative of one or more characteristics of the filtered output signal.

24. The dynamically-compensated controller of claim 23 wherein the performance characteristics include a gain margin and a phase margin of the feedback circuit.

25. The dynamically-compensated controller of claim 24 wherein the performance characteristics include the loop unity-gain bandwidth of the feedback circuit.

26. The dynamically-compensated controller of claim 23 wherein the feedback is configured to provide an integrating function, a derivative function, and a proportional function and to scale each in accordance with one of the optimization signals.

27. The dynamically-compensated controller of claim 23 wherein the switching signal has a frequency and wherein the second analog-to-digital converter is configured to sample at a frequency that is less than the frequency of the switching signal.

28. The dynamically-compensated controller of claim 23 wherein feedback circuit, the optimizer circuit, the test perturbation signal generator circuit, and the analyzer circuit are each configured to process digital signals.

29. The dynamically-compensated controller of claim 23 wherein feedback circuit, the optimizer circuit, the test perturbation signal generator circuit, and the analyzer circuit are all on a single integrated circuit.

* * * * *